J. N. JOHNSTON.
ROPE SOCKET CLAMP.
APPLICATION FILED AUG. 28, 1908.
932,556.
Patented Aug. 31, 1909.
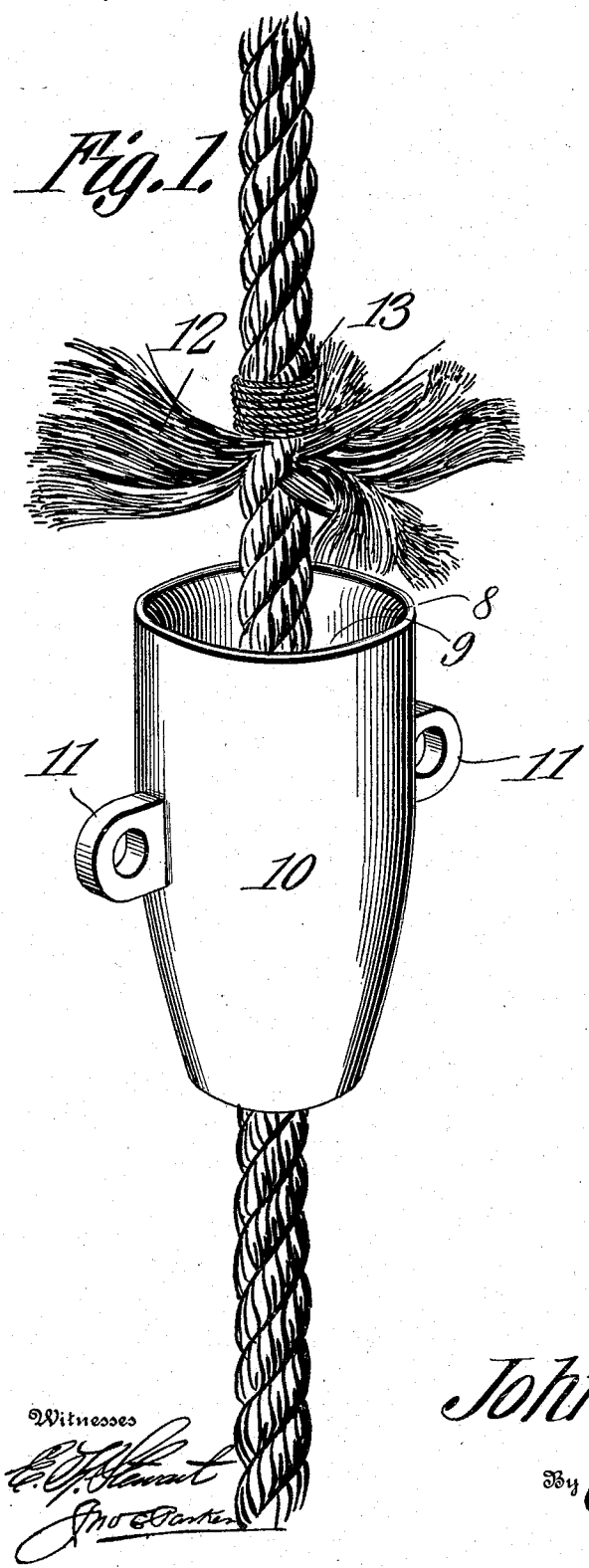
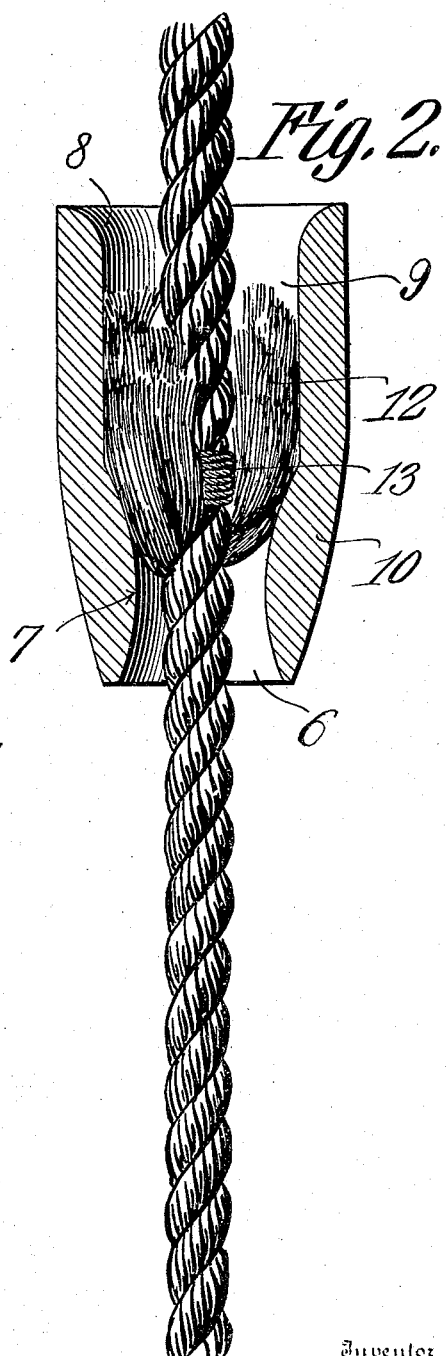
Inventor
John N. Johnston.

UNITED STATES PATENT OFFICE.

JOHN NEVIN JOHNSTON, OF BUTLER, PENNSYLVANIA.

ROPE-SOCKET CLAMP.

932,556.

Specification of Letters Patent. Patented Aug. 31, 1909.

Application filed August 28, 1908. Serial No. 450,736.

*To all whom it may concern:*

Be it known that I, JOHN N. JOHNSTON, a citizen of the United States, residing at Butler, in the county of Butler and State of Pennsylvania, have invented a new and useful Rope-Socket Clamp, of which the following is a specification.

The principal object of the present invention is to provide a novel form of jerkline socket for spudding shoes, which may be attached at any point in the length of the line, and which may be readily removed from position without injury to the line.

A further object of the invention is to provide a spudding shoe attaching socket of such construction that it will automatically bind the spudding line without the necessity of employing bolts, screws, or other clamping devices, and without the necessity of forming a knot in the rope.

With these and other objects in view, as will more fully hereinafter appear, the invention consists in certain novel features of construction and arrangement of parts, more fully hereinafter described, illustrated in the accompanying drawings, and more particularly pointed out in the appended claim, it being understood that various changes in the form, proportion, size and minor details of the structure may be made without departing from the spirit or sacrificing any of the advantages of the invention.

In the accompanying drawings:—Figure 1 is a perspective view of a socket constructed in accordance with the invention, showing the rope provided with an enlargement in readiness to be pulled into the socket. Fig. 2 is a vertical sectional view through the socket showing the rope clamped in place.

The socket 10 is preferably formed of metal, externally tapered at its lower end, and provided with a cylindrical, axial bore 9, outwardly flaring at its upper terminal to form a curved edge 8. An annular shoulder 7, integral with the sleeve 10, projects into the bore 9 at the lower end thereof, the said shoulder being curved in the direction of and throughout its length to meet the inner wall of the sleeve forming a conical bore adapted to receive the strands 12, as shown in Fig. 2. At the opposite sides of the sleeve are eyes 11 to permit convenient attachment to the spudding shoes.

The line is prepared by slightly opening the strands and passing therethrough short strands of rope or other suitable material as indicated at 12, and these auxiliary enlarging strands are held in place by wrapping the rope as indicated at 13 so that when subjected to strain, the auxiliary strands will not be pulled from place.

The auxiliary or enlarging strands 12 are preferably passed through the rope in all directions so as to project out all around the rope and when the rope is pulled down into the socket these auxiliary strands will form an approximately conical enlargement that will be firmly wedged in the conical bore of the socket, and which will prevent the rope pulling through the socket.

The socket may be readily detached by simply pulling the enlarged portion out of the conical bore, and then removing the wrapping and auxiliary strands, the rope being uninjured. The auxiliary strands will further act as parceling to protect the rope from chafing through contact with the socket.

While the device is intended preferably for use in connection with jerklines, it is obvious that it may be employed at the end of a line or lines to be connected, all such sockets being placed in position and then connected to each other in any suitable manner.

It will be understood that the eyes 11 are shown merely to illustrate one of the common and well known means of attachment for spudding shoes, and that any of such means may be employed in this connection.

It will be seen that as the auxiliary strands 12 move into the axial bore 9, they will engage the curved edge 8 and be led fairly and evenly into said bore, the strands 12 passing smoothly over the edge 8, thus reducing to a minimum, the possibility of cutting or injuring the strands through contact with the sleeve 10. The shape of edge 8, further prevents the rope proper from being frayed or injured by contact with the sleeve. The shape of the shoulder 7 is such that, while presenting superiorly, a conical bore adapted to hold firmly the strands 12 as shown in Fig. 2, it presents anteriorly, an outwardly flaring edge 6, through which the rope may pass without danger of becoming cut or frayed.

What is claimed is:—

In a spudding shoe attaching device, a rope, auxiliary strands passing therethrough, a winding extending around the rope above such auxiliary strands, and a socket member having a tapered bore for the reception of the enlarged portion of the rope formed by said auxiliary strands.

In testimony that I claim the foregoing as my own, I have hereto affixed my signature in the presence of two witnesses.

JOHN NEVIN JOHNSTON.

Witnesses:
ALEX MITCHELL,
CHAS. M. MITCHELL.